(12) United States Patent
Roth

(10) Patent No.: US 8,122,991 B2
(45) Date of Patent: Feb. 28, 2012

(54) DRIVETRAIN, HYBRID VEHICLE, AND OPERATING METHODS THEREFOR

(75) Inventor: Martin Roth, Rutesheim (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 343 days.

(21) Appl. No.: 12/176,103

(22) Filed: Jul. 18, 2008

(65) Prior Publication Data
US 2009/0020354 A1    Jan. 22, 2009

(30) Foreign Application Priority Data
Jul. 19, 2007   (DE) .................... 10 2007 033 575

(51) Int. Cl.
    *B60K 6/10*   (2006.01)
(52) U.S. Cl. ............... 180/165; 180/65.265; 180/65.28; 180/65.285; 180/65.29
(58) Field of Classification Search ............. 180/65.21, 180/65.245, 65.26, 65.265, 65.275, 65.285, 180/65.29, 165
See application file for complete search history.

(56) References Cited

U.S. PATENT DOCUMENTS

| | | | |
|---|---|---|---|
| 4,309,620 A | 1/1982 | Bock | |
| 6,506,139 B2* | 1/2003 | Hirt et al. | 477/3 |
| 6,593,713 B2* | 7/2003 | Morimoto et al. | 318/139 |
| 7,294,938 B2* | 11/2007 | Miyao | 290/45 |
| 7,469,169 B2 | 12/2008 | Dreibholz et al. | |

FOREIGN PATENT DOCUMENTS

| | | |
|---|---|---|
| DE | 19700893 C1 | 9/1998 |
| DE | 19917276 A1 | 10/2000 |
| DE | 10012494 A1 | 9/2001 |

* cited by examiner

*Primary Examiner* — J. Allen Shriver, II
*Assistant Examiner* — Erez Gurari
(74) *Attorney, Agent, or Firm* — Gerald E. Hespos; Michael J. Porco

(57) ABSTRACT

A drivetrain for a hybrid vehicle includes an internal combustion engine, a transmission and electric machine, and an electrical energy store. The electric machine is usable as a generator for charging the electrical energy store and/or as a motor while discharging the electrical energy store. The electrical energy store is implemented as a flywheel mass accumulator having an assigned second electric machine. The flywheel mass accumulator is able to be mechanically coupled to the internal combustion engine via a separate clutch, and thus also is mechanically chargeable and dischargeable.

5 Claims, 3 Drawing Sheets

Construction

DRIVETRAIN, HYBRID VEHICLE, AND OPERATING METHODS THEREFOR

CROSS-REFERENCE TO RELATED APPLICATION

This application claims the priority of German Application No. 10 2007 033 575.1, filed Jul. 19, 2007, the disclosure of which is expressly incorporated by reference herein.

BACKGROUND AND SUMMARY OF THE INVENTION

The invention relates to a drivetrain for a hybrid vehicle, as well as a corresponding hybrid vehicle and operating methods therefor.

Hybrid vehicles typically have an internal combustion engine and at least one electric machine. The internal combustion engine is provided either for charging an electrical energy store, such as the vehicle battery (serial hybrid operation) and/or as a motor, for driving the hybrid vehicle (parallel hybrid drive). Both of these operating states are frequently utilized, in that the electrical energy store is charged periodically and then used at other times for the electrical drive of the hybrid vehicle.

There is therefore needed an efficient electrical energy store for a hybrid vehicle, in which, in particular, energy conversion losses are minimized.

According to the invention, a drivetrain for a hybrid vehicle has an electrical energy store, which is implemented as a flywheel mass accumulator having an assigned second electric machine. The flywheel mass accumulator is able to be mechanically coupled, via a separate clutch, to the internal combustion engine. The flywheel mass accumulator also is mechanically chargeable and dischargeable. A flywheel mass accumulator already offers the advantages of wear-free energy storage at high energy density in relation to the batteries which are typically used. Through the invention, the flywheel mass accumulator is now not only electrically, but also additionally mechanically usable. The losses upon the conversion of mechanical into electrical energy and vice versa are thus dispensed with. Furthermore, the energy store may be adapted optimally to a particular energy consumer and/or provider, in that an electric machine (electrical usage) is employed in the range of higher speeds of the flywheel mass accumulator and the internal combustion engine (mechanical usage) is employed in the lower speed ranges.

In a first embodiment of the invention, the flywheel mass accumulator, the assigned second electric machine, and the separate clutch are provided as a unit, in particular on a shaft between the internal combustion engine and the transmission of the hybrid vehicle. A universally usable unit thus results, in which a mechanical connection to the internal combustion engine is provided via the flywheel mass accumulator and/or the separate clutch.

In a further embodiment of the invention, the flywheel mass accumulator, both electric machines, and the clutch are provided as a unit, in particular on a shaft between the internal combustion engine and the transmission of the hybrid vehicle. This allows for a hybrid vehicle which is simple to construct, in which the essential components may already be installed using one unit.

It is advantageous if a further clutch is provided for decoupling the assigned second electric machine from the flywheel mass accumulator. By dispensing with the idle powering, further energy savings thus result.

The method according to the invention for operating a corresponding hybrid vehicle provides that the separate clutch is opened so that the flywheel mass accumulator absorbs or discharges electrical energy via the assigned second electric machine, i.e., is used electrically. In this operating method according to the invention, various typical hybrid functionalities may be implemented without problems. In particular, purely electric driving and/or the support of the internal combustion engine by the electric machine (electric boosting) and electric charging of the energy store via the internal combustion engine are possible. For purely electric driving, only the electric machine operates as a motor for driving the hybrid vehicle. For electric boosting, the electric machine, operated as a motor, drives the hybrid vehicle together with the internal combustion engine. In each case, the flywheel mass accumulator discharges mechanical energy to the assigned second electric machine, which is operated as a generator and thus delivers the electrical energy to drive the electric machine. To charge the energy store, the electric machine, operated as a generator, is driven by the internal combustion engine. The electrical energy is delivered by the electric machine driving the second electric machine assigned to the flywheel mass accumulator. The second electric machine assigned to the flywheel mass accumulator is thus used as a motor for mechanically driving the flywheel mass accumulator and thus charging it. A load point shift of the internal combustion engine for its usage optimization is also possible here. Recuperation may also be implemented in overrun of the hybrid vehicle, i.e., for example, if the internal combustion engine is disengaged and/or shutdown (not fueled) during its deceleration or when driving downhill, and the electric machine is operated as a generator. The electrical energy delivered then drives the second electric machine assigned to the flywheel mass accumulator. This is thus driven as a motor, to mechanically drive the flywheel mass accumulator and thus charge it.

The running supply of the vehicle electrical system with electrical energy may either be provided by the electric machine operated as a generator and driven by the internal combustion engine, or by discharging mechanical energy of the flywheel mass accumulator to the assigned second electric machine operated as a generator. In particular, it may be ensured by an appropriate regulation that the internal combustion engine is always operated at good efficiency. For this purpose, a division may also be provided in such a manner that the electric machine driven by the internal combustion engine only delivers enough electrical energy that operation of the internal combustion engine at optimum efficiency is ensured. The remainder of the electrical energy required by the vehicle electrical system is then supplied as needed by discharging mechanical energy of the flywheel mass accumulator to the assigned second electric machine. The charging of the flywheel mass accumulator may also be regulated correspondingly, to ensure operation of the internal combustion engine at optimal efficiency. For example, the load point of the internal combustion engine is raised to operate the electric machine as a generator. The delivered electrical energy then drives the second electric machine assigned to the flywheel mass accumulator. This electric machine is therefore driven as a motor, to mechanically drive the flywheel mass accumulator and thus charge it.

An electrical energy store operation is advantageous, in which, when the hybrid vehicle is approximately at a standstill, the flywheel mass accumulator is electrically charged by the internal combustion engine by opening the separate clutch. The electric machine is driven via the internal combustion engine for operation as a generator to generate electrical energy. This electrical energy is then used to drive the second electric machine assigned to the flywheel mass accumulator. The second electric machine is thus driven as a motor, to mechanically drive the flywheel mass accumulator and thus charge it.

In an alternative method according to the invention for operating a corresponding hybrid vehicle, the separate clutch is closed so that the flywheel mass accumulator is mechanically coupled to the internal combustion engine, because of which the flywheel mass accumulator absorbs and/or discharges mechanical energy. This allows use of the mechanical energy stored in the flywheel mass accumulator without electrical conversion losses. For reasons of comfort, before the separate clutch is closed, the difference of the speeds between the flywheel mass accumulator and the internal combustion engine may be electrically minimized by the second electric machine assigned to the flywheel mass accumulator, which is operated as a motor. In particular, a serial hybrid operation may be implemented, in that the flywheel mass accumulator is driven by the internal combustion engine and delivers electrical energy for the electric machine for driving the hybrid vehicle via the assigned second electric machine. This allows power-regulated operation of the internal combustion engine at the optimum consumption. The electric machine for driving the hybrid vehicle varies the torque as a function of the speed and the assigned transmission shifts for optimum efficiency (Eta of the electric machine times; Eta of the transmission). In other words, this allows an electric continuous transmission (E-CVT operation).

Mechanical starting and/or restarting of the internal combustion engine by the flywheel mass accumulator is advantageously provided. For this purpose, the transmission of the hybrid vehicle may be shifted into the neutral setting and/or the clutch between the transmission and the internal combustion engine may be opened. The internal combustion engine is then mechanically started by the flywheel mass accumulator by slipping the assigned separate clutch. Alternatively, electric starting and/or restarting of the internal combustion engine are provided. The electrical energy store is used in a typical way for starting, while for restarting, the assigned separate clutch is opened and the internal combustion engine is started by the electric machine. To increase the service life of the electrical energy store (e.g., cycle strength of the vehicle battery), the internal combustion engine is preferably started mechanically. If this is not possible, e.g., if the flywheel mass accumulator no longer has sufficient energy after a long shutdown time, then the internal combustion engine is started electrically. The selection between electrical and mechanical measures is implemented automatically, in particular, e.g., by a corresponding electronic circuit that monitors the flywheel mass accumulator. Alternatively or additionally, a manual selection is provided, e.g., via a switch.

A mechanical energy store operation is advantageously provided, in which, when the vehicle is approximately at a standstill, the flywheel mass accumulator is mechanically charged by the internal combustion engine by closing the separate clutch. For this purpose, the transmission of the hybrid vehicle may be shifted into the neutral setting and the separate clutch may be slipped.

The electrical and/or mechanical energy store operation when the vehicle is approximately at a standstill allows rapid charging of the energy store when stationary with a subsequent "running start" of the hybrid vehicle. For this purpose, the advantages of the flywheel mass accumulator as an electrical energy store are used. The electrical energy required for this purpose may be provided very rapidly, in particular during mechanical charging. This may be implemented when waiting in front of a traffic light, for example, if it is known to the driver that a vehicle start is imminent. In this case, he charges up the flywheel mass accumulator during the red light, for example, to perform a rapid start when the traffic light switches to green. Upon the rapid start, the energy stored in the flywheel mass accumulator is supplied via the electric machine to the transmission as a function of the maximum possible traction and a running start is thus made possible. Alternatively or additionally, an electrical energy store operation is provided. In particular, optimized rapid charging of the flywheel mass accumulator may be provided, in that first (i.e., in the lower speed ranges of the flywheel mass accumulator) the internal combustion engine is used and then (i.e., in the higher speed ranges of the flywheel mass accumulator, i.e., significantly higher than the speed of the internal combustion engine), an electric machine is used. For this purpose, an automatic and/or manual changeover may be used, possibly combined with an operating interface for initiating the rapid charging, such as a corresponding switch or pedal.

In summary, the present invention provides for a hybrid vehicle having a flywheel mass accumulator that is especially advantageous for storage of energy. This occurs nearly without wear, at high energy density, and with good efficiency for the storage and discharge of energy. Electrical and/or mechanical drive or output may be implemented by positioning the flywheel mass accumulator in the drive train.

Other objects, advantages and novel features of the present invention will become apparent from the following detailed description when considered in conjunction with the accompanying drawings.

DETAILED DESCRIPTION OF THE DRAWINGS

Figure 1:
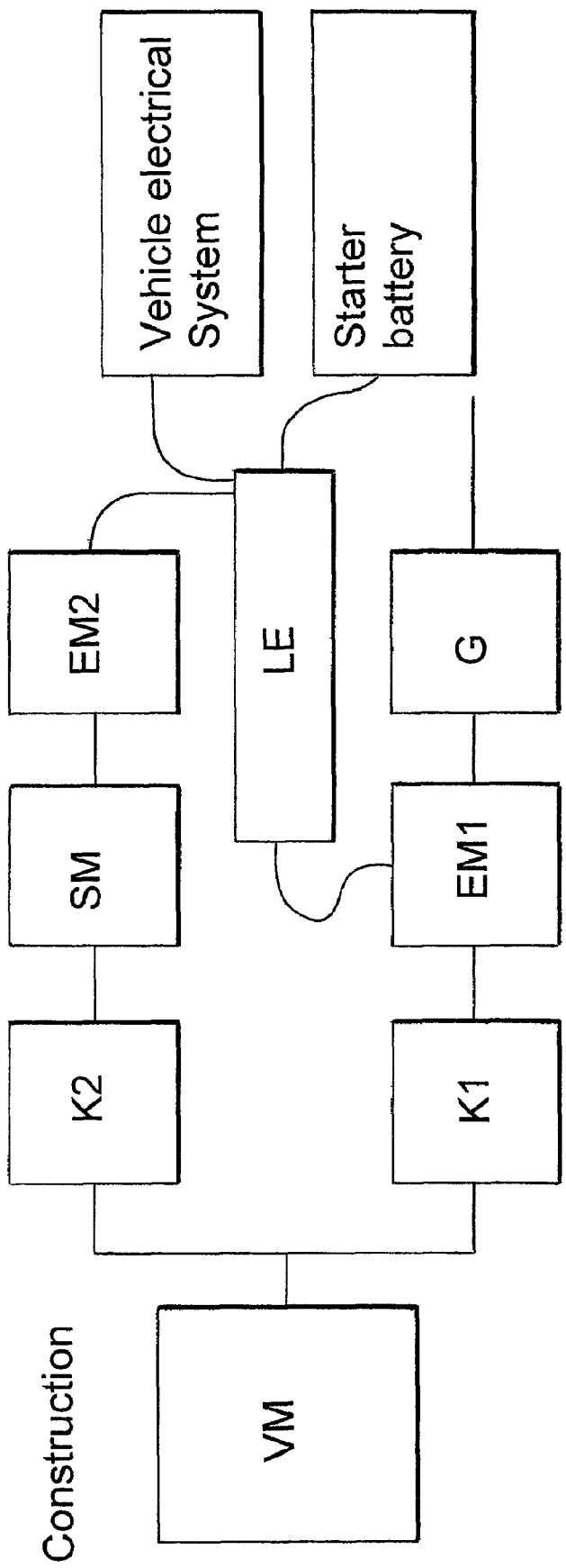
FIG. 1 is a schematic block diagram according to the present invention.

FIG. 1 schematically illustrates the various components of a typical drivetrain, such as the internal combustion engine VM, the transmission G connected via a clutch K1, and the vehicle electrical system B and starter battery S.

The first and second electric machines EM1 and EM2, the flywheel mass accumulator SM, a further clutch K2, and the power electronics LE are provided as additional components. The flywheel mass accumulator SM is mechanically connected via the separate clutch K2 to the internal combustion engine VM. Furthermore, the second electric machine EM2 is assigned to the flywheel mass accumulator SM. This assigned second electric machine EM2 may either be operated as a generator and thus discharge electrical energy, or as a motor and thus absorb electrical energy. In other words, the assigned second electric machine EM2 is operated as a generator during the mechanical discharging of the flywheel mass accumulator SM and as a motor during the electrical charging of the flywheel mass accumulator SM.

When the separate clutch K2 is opened, there is no mechanical connection of the flywheel mass accumulator SM to the internal combustion engine VM. In this configuration, the combination of flywheel mass accumulator SM and second electric machine EM2 acts only like an electrical energy store. However, if the separate clutch K2 is closed, a mechanical connection of the flywheel mass accumulator SM and thus also the assigned second electric machine EM2 to the internal combustion engine VM occurs.

Figure 2:
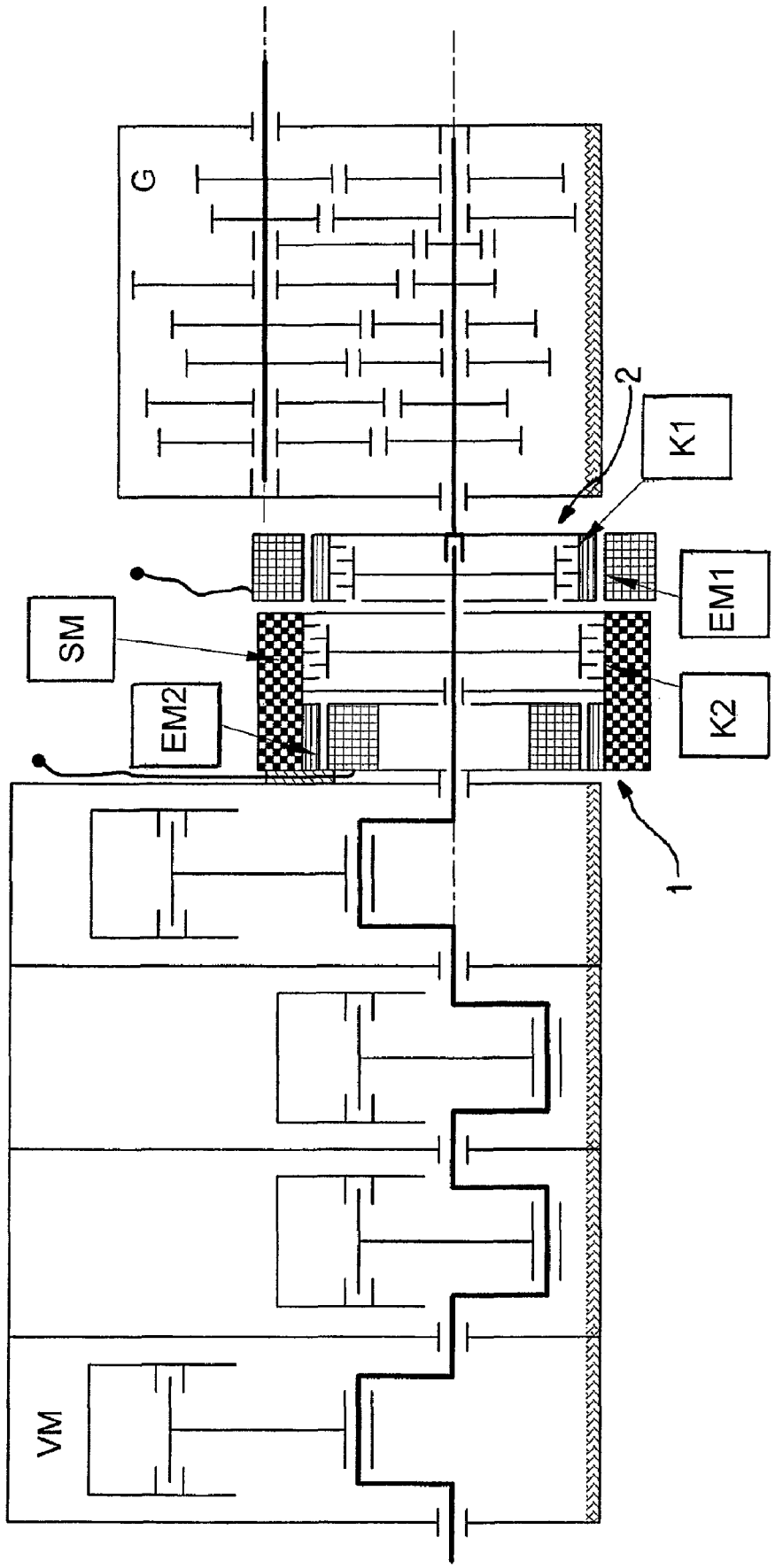
FIG. 2 is a diagram of a first preferred embodiment according to the invention.

FIG. 2 shows a first preferred embodiment of the invention. The flywheel mass accumulator SM, the assigned second electric machine EM2, and the separate clutch K2 are provided as a unit 1 on the shaft between the internal combustion engine VM and the transmission G of the hybrid vehicle. The electric machine EM1, connected via the clutch K1, and transmission G are implemented as a further unit 2. An integrated unit usable for various clutches K1 or electric machines EM1 thus results, which minimizes the space needed between internal combustion engine VM and the transmission G with a compact construction and is nonetheless relatively universally usable.

Figure 3:
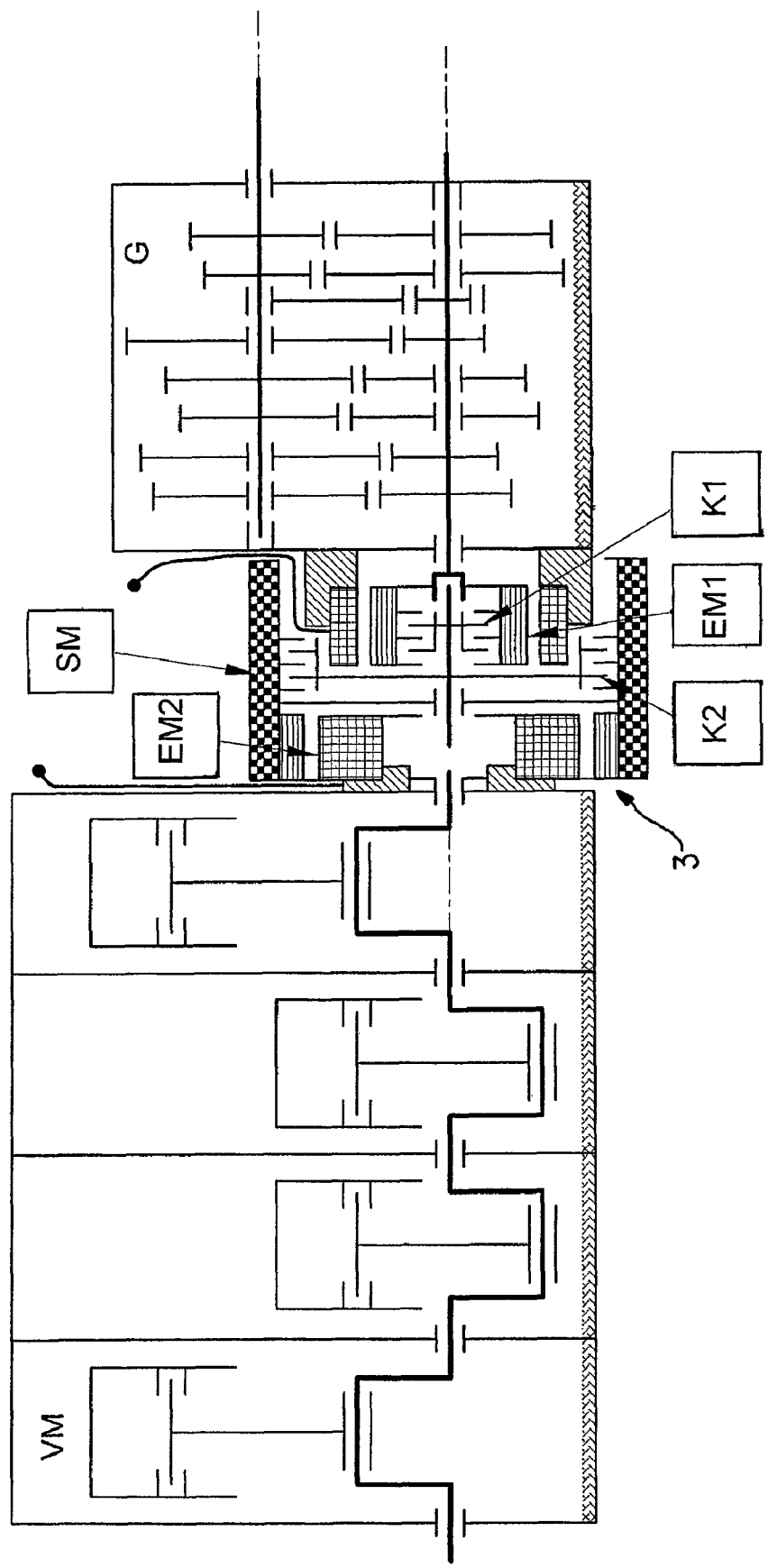
FIG. 3 is a diagram of a second preferred embodiment according to the invention.

FIG. 3 shows a second preferred embodiment of the invention. Here, the flywheel mass accumulator SM, both electric machines EM1 and EM2, and clutches K1 and K2 are provided as a unit 3 on the shaft between the internal combustion engine VM and the transmission G of the hybrid vehicle. This allows a highly integrated unit for a hybrid vehicle having a simple construction, in which essential components may already be installed using a single, especially compact unit between internal combustion engine VM and the transmission G.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drivetrain for a hybrid vehicle, comprising:
   an internal combustion engine;
   a transmission;
   a first unit having a first electric machine and a first clutch for mechanically coupling the first electric machine to the internal combustion engine; and
   a second unit having a flywheel mass accumulator, an assigned second electric machine and a separate second clutch for mechanically coupling the flywheel mass accumulator to the internal combustion engine, wherein the flywheel mass accumulator is mechanically chargeable by the second electric machine and dischargeable to the second electric machine, and wherein the first electric machine is selectively connectable to the second electric machine so that the first electric machine drives the second electric machine to operate the second electric machine as a motor for mechanically driving the flywheel mass accumulator and thereby charging the flywheel mass accumulator.

2. A hybrid vehicle, comprising:
   a drivetrain comprising:
   an internal combustion engine;
   a transmission;
   a first unit having a first electric machine and a first clutch for selectively coupling the first electric machine to the internal combustion engine; and
   a second unit having a flywheel mass accumulator having, an assigned second electric machine and a separate second clutch for selectively coupling the flywheel mass accumulator to the internal combustion engine, wherein the flywheel mass accumulator is mechanically chargeable by the second electric machine and dischargeable to the second electric machine, and wherein the first electric machine is selectively connectable to the second electric machine so that the electric machine drives the second electric machine to operate the second electric machine as a motor for mechanically driving the flywheel mass accumulator and thereby charging the flywheel mass accumulator.

3. A method for operating a hybrid vehicle having a drivetrain including an internal combustion engine; a transmission; an electric machine; a flywheel mass accumulator with an assigned second electric machine and a separate clutch for selectively mechanically coupling the flywheel mass accumulator to the internal combustion engine, wherein the electric machine is configured for operation as a generator for charging the flywheel mass accumulator and as a motor while discharging the flywheel mass accumulator; and wherein the flywheel mass accumulator is mechanically chargeable by the second electric machine and dischargeable to the second electric machine, the method comprising:
   selectively opening the separate clutch for absorbing or discharging electrical energy by the flywheel mass accumulator via the assigned second electric machine and selectively closing the separate clutch for mechanically coupling the flywheel mass accumulator to the internal combustion engine to absorb mechanical energy from the internal combustion engine or to discharge mechanical energy to the internal combustion engine so that the method carries out:
   during a first set of operating conditions, a discharging of electrical energy from the second electric machine to operate the electric machine as a motor for at least one of pure electric driving and as a boost to the driving by the internal combustion engine;
   during a second set of operating conditions, an absorbing of electrical energy by the second electric machine that is discharged by the electric machine operated as a generator and driven by the internal combustion engine; and
   during a third set of operating conditions, an operating of the internal combustion engine for driving the electric machine so that the electric machine is operated as a generator to generate electrical energy, using the electrical energy generated by the electric machine to drive the second electric machine and operating the second electric machine as a motor to mechanically drive the flywheel mass accumulator and to thereby charge the flywheel mass accumulator.

4. The method according to claim 3, wherein restarting of the internal combustion engine is performed mechanically by the flywheel mass accumulator.

5. A method for operating a hybrid vehicle having a drivetrain including an internal combustion engine; a transmission; an electric machine; a flywheel mass accumulator with an assigned second electric machine and a separate clutch for selectively mechanically coupling the flywheel mass accumulator to the internal combustion engine, wherein the electric machine is operatively configured for operation as a generator for charging the flywheel mass accumulator and as a motor while discharging the flywheel mass accumulator; and wherein the flywheel mass accumulator is mechanically chargeable by the second electric machine and dischargeable to the second electric machine, the method comprising:

opening the separate clutch; and absorbing or discharging electrical energy by the flywheel mass accumulator via the assigned second electric machine, wherein the step of absorbing or discharging electrical energy by the flywheel mass accumulator comprises operating the internal combustion engine for driving the electric machine so that the electric machine is operated as a generator to generate electrical energy, and using the electrical energy generated by the electric machine to drive the second electric machine assigned to the flywheel mass accumulator so that the second electric machine is operated as a motor to mechanically drive the flywheel mass accumulator and to thereby charge the flywheel mass accumulator.

* * * * *